(12) United States Patent
Ohishi

(10) Patent No.: US 7,318,460 B2
(45) Date of Patent: Jan. 15, 2008

(54) FUEL CHARGING STRUCTURE OF VEHICLE

(75) Inventor: Hitoshi Ohishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 11/360,718

(22) Filed: Feb. 23, 2006

(65) Prior Publication Data

US 2006/0186146 A1  Aug. 24, 2006

(30) Foreign Application Priority Data

Feb. 24, 2005 (JP) .............................. 2005-049556

(51) Int. Cl.
*B65B 1/04* (2006.01)
(52) U.S. Cl. ..................... 141/98; 141/94; 361/217
(58) Field of Classification Search ............ 141/1, 141/18, 83, 94, 97, 98; 361/212–217; 220/86.2
See application file for complete search history.

(56) References Cited

U.S. PATENT DOCUMENTS

| | | | | |
|---|---|---|---|---|
| 1,564,925 A | * | 12/1925 | Anthony | 361/215 |
| 4,901,195 A | * | 2/1990 | Stemporzewski, Jr. | 361/217 |
| 5,159,523 A | * | 10/1992 | Claassen et al. | 361/215 |
| 5,927,316 A | * | 7/1999 | Merrill | 137/68.14 |
| 6,401,767 B1 | * | 6/2002 | Cohen et al. | 141/1 |
| 6,655,424 B2 | * | 12/2003 | Kawazu et al. | 141/98 |

FOREIGN PATENT DOCUMENTS

JP  2003-291667  10/2003

* cited by examiner

*Primary Examiner*—Timothy L. Maust
(74) *Attorney, Agent, or Firm*—Rankin, Hill, Porter & Clark LLP (57) ABSTRACT

A fuel gas charging portion structure of a gas fuel vehicle includes a fuel gas charging port to which a fuel charging nozzle of an external fuel charging station is to be connected, an earthing portion to which a earth wire of the fuel gas charging station to be connected, a lid which is opened or closed selectively for covering both the earthing portion and the fuel charging port, and the earthing portion further includes a plurality of members. The fuel gas charging port is at least partially covered by bringing the earthing portion into a folded state when the lid is closed, while the earthing portion is brought into a state of being connectable with the earth wire 32 from the folded state and the fuel charging nozzle 31 is brought into a state of being chargeable to the fuel gas charging port when the lid is open.

7 Claims, 9 Drawing Sheets

FUEL CHARGING STRUCTURE OF VEHICLE

The present invention claims foreign priority to Japanese patent application No. 2005-049556, filed on Feb. 24, 2005, the subject matter of which is incorporated herein by reference.

BACKGROUND OF THE INVENTION

1. Field of the Invention

The present invention relates to a structure of a fuel charging portion of a vehicle capable of earthing a fuel charging nozzle to a vehicle body.

2. Description of the Related Art

As a structure of a fuel charging portion of a vehicle, there is proposed a structure capable of earthing a fuel charging nozzle to a vehicle body.

For example, in a vehicle having a fuel tank for storing a fuel gas such as hydrogen, it is preferable that a fuel charging nozzle be earthed to a vehicle body when charging the fuel gas to the fuel tank. Thus, a structure of a fuel charging portion of a vehicle that urges an operator charging a fuel gas to earth the fuel charging nozzle to the vehicle body before charging the fuel gas has been developed to a practical stage.

For instance, a structure of a fuel charging portion provided with an earthing port and a fuel charging port separately is known (For example, see Japanese Patent Unexamined Publication JP-A-2003-291667, page 6 and FIG. 3).

Figure 9:
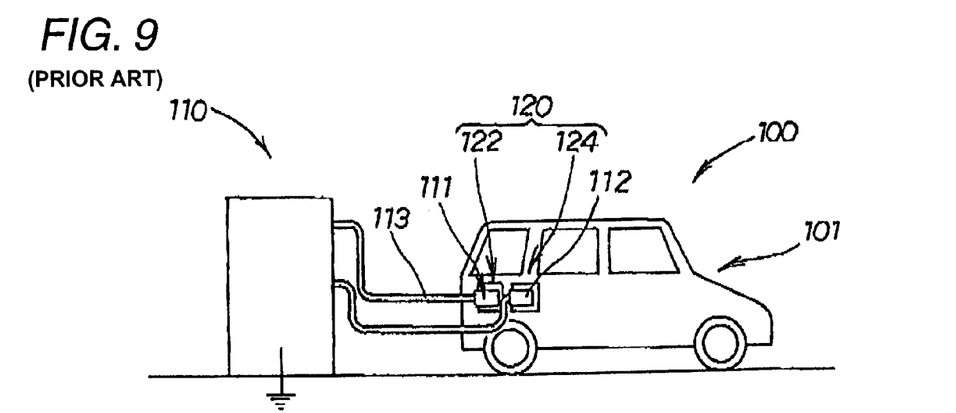
FIG. 9 is a view for explaining a basic principle of a related art.

FIG. 9 illustrates a basic principle of such a related art. A fuel gas charging station 110 is provided with a fuel gas charging nozzle 111 for charging a fuel gas and an earth wire 112 for earthing the fuel gas charging nozzle to a vehicle body 101. Numeral 113 designates a hose attached to the fuel gas charging nozzle 111.

A structure 120 of a fuel charging portion of a vehicle includes a fuel gas charging portion 122 for charging the fuel gas to a vehicle 100 by inserting the fuel gas charging nozzle 111 of the fuel gas charging station 110 thereto, and an earthing portion 124 for nullifying a voltage potential difference between the fuel gas charging station 110 and the vehicle 100 by connecting the earth wire 112 of the fuel gas charging station 110 thereto. The fuel gas charging portion 122 and the earthing portion 124 are disposed individually and independently at the vehicle body 101.

Figure 10:
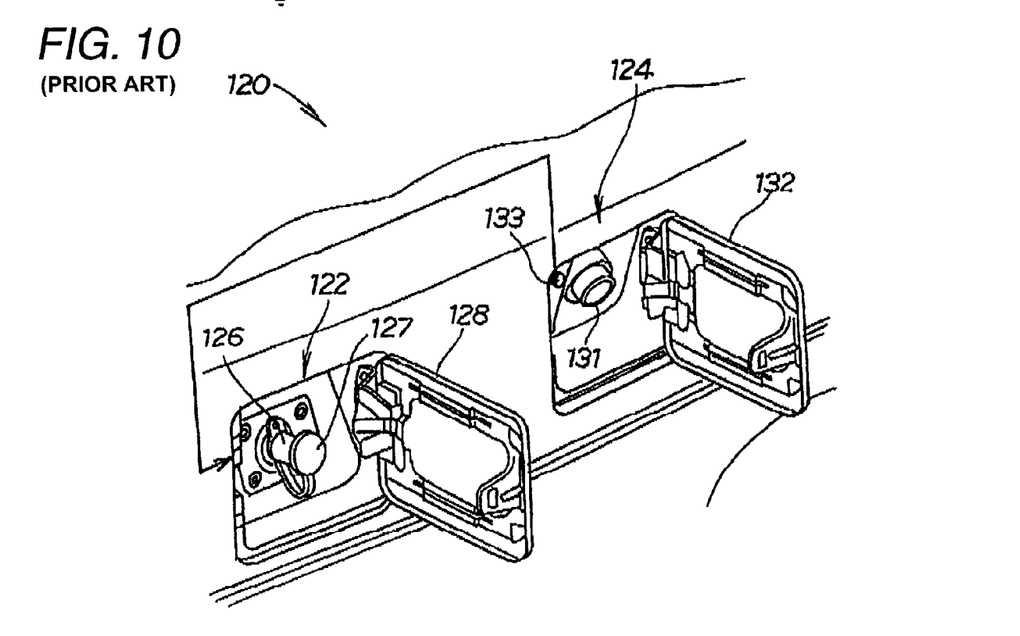
FIG. 10 is a view for explaining a basic constitution of the related art.

FIG. 10 illustrates a basic constitution of the related art. The fuel gas charging portion 122 includes a gas charging port 126 provided at the vehicle body 101, a cap 127 for detachably covering the gas charging port 126, and a lid of charging side (lid for fuel) 128 which is opened or closed selectively for covering both the gas charging port 126 and the cap 127.

The earthing portion 124 includes an earthing port 131 provided at the vehicle body 101, an lid of an earthing side (lid for earthing) 132 which is opened or closed selectively for covering the earthing port 131, and a lid opener 133 for opening the lid of charging side 128 of the fuel gas charging portion 122.

That is, the structure 120 of the fuel charging portion of the vehicle is constituted such that the lid of charging side 128 cannot be opened unless the lid of earthing side 132 is opened.

Although an operator can firmly be urged to earthing operation when charging the fuel gas according to the structure 120 of the fuel charging portion of the vehicle, the fuel gas charging portion 122 and the earthing portion 124 are constituted individually and independently at the vehicle body 101. Therefore, the vehicle body needs to be provided with two lids, which are the lid of charging side 128 and the lid of earthing side 132. Consequently, the structure 120 of the fuel charging portion of the vehicle becomes complicated.

Hence, there is desired a structure of a fuel charging portion of a vehicle capable of simply constituting the structure and capable of smoothly carrying out an operation of charging the fuel gas.

SUMMARY OF THE INVENTION

It is an object of the present invention to provide a structure of a fuel charging portion of a vehicle having a simple constitution and capable of smoothly carrying out operation of charging the gas fuel.

According to a first aspect of the present invention, a fuel charging structure of a vehicle includes a fuel charging port to which a fuel charging nozzle of an external fuel charging station is to be connected, and an earthing portion to which an earth wire of the fuel charging station is to be connected. The fuel charging port is at least partially covered by the earthing portion when the earthing portion is not earthed, and the fuel charging port is brought into a state of being chargeable by the fuel charging nozzle when the earthing portion is earthed.

In such a structure, the earthing portion is removed from covering the fuel charging port before connecting the fuel charging nozzle to the fuel charging port.

Thereby, the operator can be urged to connect the earth wire to the earthing portion in the fuel gas charging operation.

Moreover, such a simple structure of the fuel gas charging portion is preferable in that a production cost can be reduced and also an operation time of charging can be shortened since the operation of charging a fuel gas can smoothly be carried out.

According to a second aspect of the present invention, as set forth in the first aspect of the present invention, the earthing portion includes a conductive portion having an earthing terminal to which the earth wire is to be connected electrically and an attaching portion to be attached to a vehicle body, and an insulating portion covered by a nonconductive coating on the surface thereof.

According to a third aspect of the present invention, as set forth in the second aspect of the present invention, the earthing terminal is disposed at one end of the earthing portion and the attaching portion is disposed at the other end of the earthing portion.

Therefore, a position of connecting the earth wire can be clearly shown, thereby the operation of charging the fuel gas is smoothly carried out.

According to a fourth aspect of the present invention, as set forth in the first aspect of the present invention, the earthing portion includes a plurality of members interconnected rotatably.

According to a fifth aspect of the present invention, as set forth in the fourth aspect of the present invention, one of the plurality of members includes an earthing terminal to which the earth wire is to be connected electrically and an insulating portion covered by a nonconductive coating on the surface thereof, and other of the plurality of members includes an attaching portion to be attached to a vehicle body.

According to a sixth aspect of the present invention, as set forth in the fourth aspect of the present invention, the fuel charging structure of a vehicle further includes a lid which is opened or closed selectively for covering both the earthing portion and the fuel charging port. Moreover, the plurality of members are interconnected rotatably so that the earthing portion is folded when stored inside the closed lid.

In such a structure, the fuel charging structure of the vehicle can be compact. As a result, for example, there is achieved an advantage of being capable of designing the lid to be the same as a lid for a gasoline vehicle and further promoting design performance of the vehicle.

In addition, a production cost of the fuel charging structure of the vehicle can further be reduced due to such a simple structure.

According to a seventh aspect of the present invention, as set forth in the fourth aspect of the present invention, the earthing portion is adopted to be pulled in order to release the fuel charging port from being covered by the earthing portion.

DETAILED DESCRIPTION OF THE PREFERRED EMBODIMENT

The best mode for carrying out the invention will be explained as follows in reference to the attached drawings. Further, the drawings are viewed in directions of notations.

Figure 1:
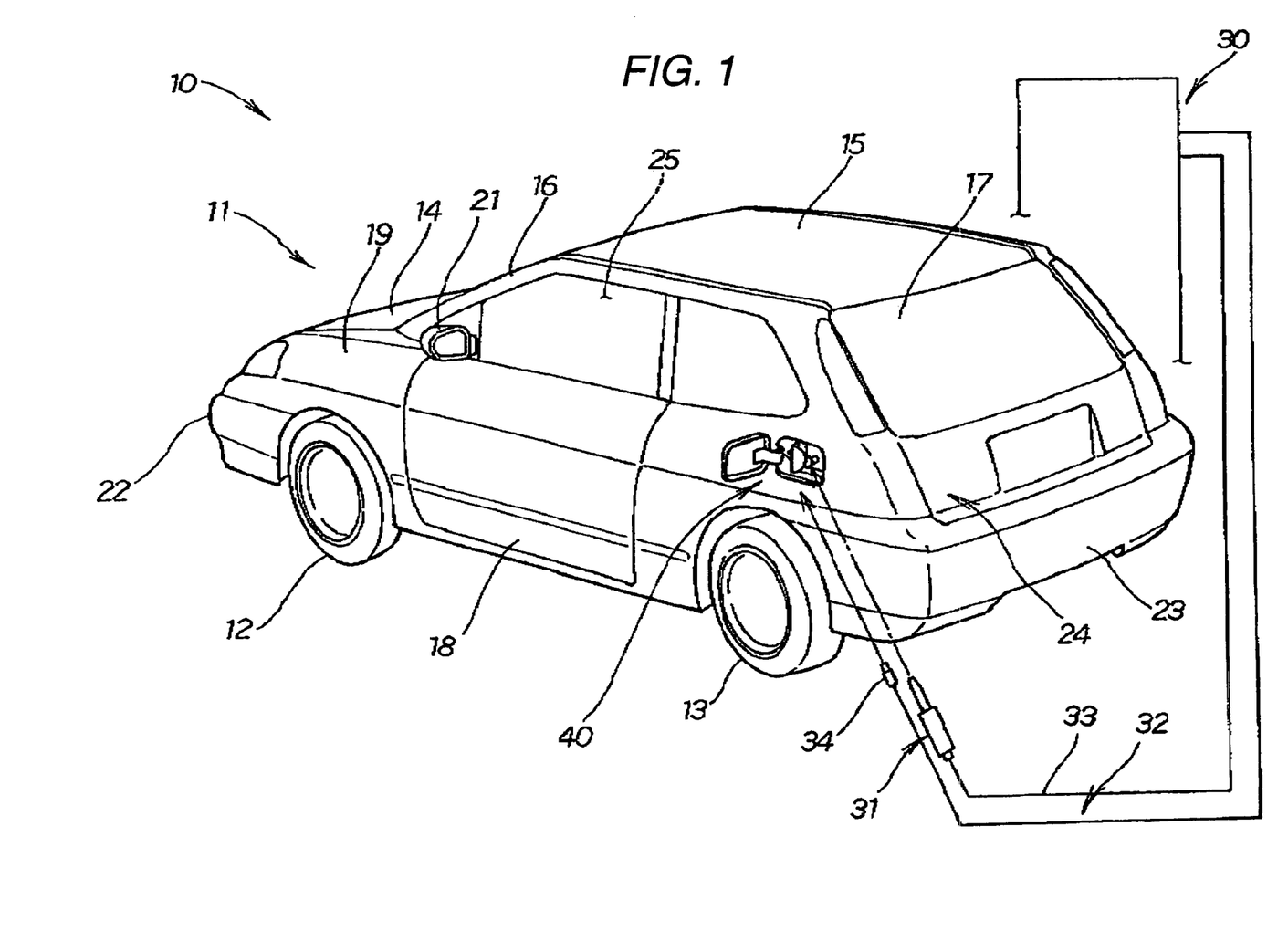
FIG. 1 is a side view of a vehicle adopting a fuel charging structure according to the present invention.

FIG. 1 is a side view of a vehicle adopting a structure of a fuel charging portion according to the present invention. In the drawing, numeral 10 designates a vehicle (gas fuel vehicle), numeral 11 designates a vehicle body, numeral 12 designates a front wheel, numeral 13 designates a rear wheel, numeral 14 designates a bonnet, numeral 15 designates a roof, numeral 16 designates a front pillar, numeral 17 designates a rear window, numeral 18 designates a door, numeral 19 designates a front fender, numeral 21 designates a door mirror, numeral 22 designates a front bumper, numeral 23 designates a rear bumper, numeral 24 designates a tail gate, and numeral 25 designates a vehicle compartment (inside of compartment).

The vehicle 10 is a fuel cell vehicle which runs by constituting energy by fuel gas of hydrogen or the like. According to a structure 40 of a fuel charging portion of a vehicle according to the present invention (hereinafter, abbreviated as fuel gas charging portion structure 40), in charging a fuel gas of hydrogen or the like from a fuel gas charging station 30 as a fuel charging station at outside of the vehicle 10, before connecting a fuel charging nozzle 31 as a fuel charging nozzle of the fuel gas charging station 30 to the vehicle body 11, by constituting a earth wire 32 of the fuel gas charging station 30 to a side of the vehicle body 11, a potential difference between the fuel gas charging station 30 and the vehicle 10 can be nullified. In other words, it can be regarded that the vehicle 10 can be earthed to the fuel gas charging station 30.

In the drawing, numeral 33 designates a hose of the fuel charging nozzle 31 and numeral 34 designates a clip attached to a front end of the earth wire 32.

Figure 2:
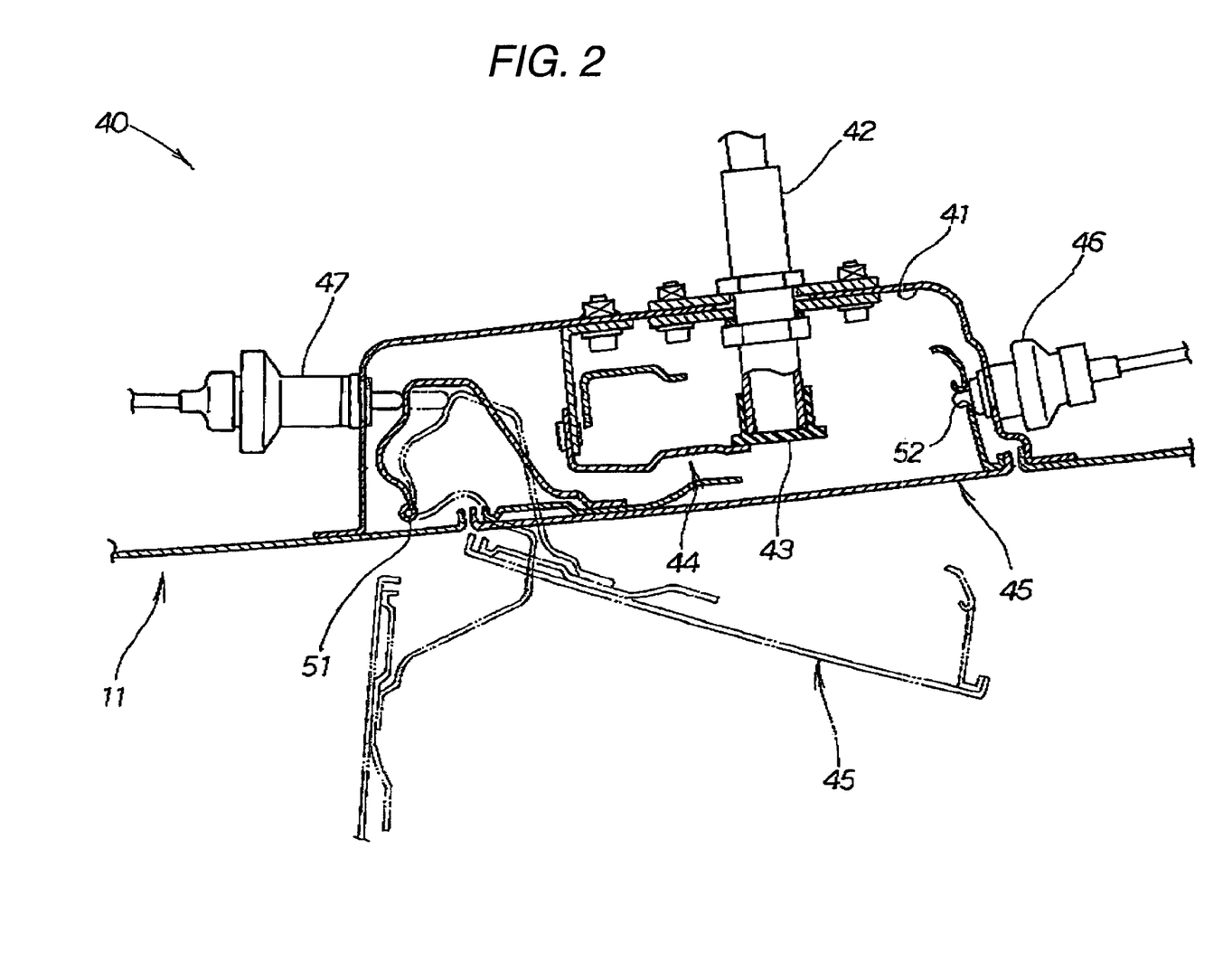
FIG. 2 is a plane sectional view of the fuel charging structure of the vehicle according to the present invention.

FIG. 2 is a plane sectional view of the fuel charging structure of the vehicle according to the present invention. The fuel gas charging portion structure (fuel lid structure of fuel cell vehicle) 40 includes a recess portion 41 formed at the vehicle body 11, a fuel gas charging port 42 provided at the recess portion 41, a cap 43 for closing the fuel gas charging port 42, an earthing portion 44 for connecting the earth wire 32 of the fuel gas charging station 30 (refer to FIG. 1) and covering a portion of the fuel gas charging port 42 by way of the cap 43, a lid (fuel lid) 45 for summarizingly openably and closably covering the fuel gas charging port 42, the cap 43 and the earthing portion 44, a lid opener 46 for locking the lid 45 to a side of the recess portion 41 or opening the lid 45 from the side of the recess portion 41, and a sensing switch 47 for urging the lid 45 in an opening direction and detecting (sensing) whether the lid 45 is brought into an opened state or a closed state.

The lid 45 can be attached openably and closably to the vehicle body 11 by providing a hinge 51 at one end thereof and can be locked to the side of the vehicle body 11 by providing a locking portion 52 for locking to the lid opener 46 at other end thereof.

The lid opener 46 is an actuator capable of being operated electrically, a member set to be able to be operated only when a shift lever (not illustrated) is set to a parking range, and is a member capable of bringing the lid 45 into an opened state by transmitting an electric signal from the vehicle compartment 25 (refer to FIG. 1).

The sensing switch 47 is a member capable of opening the lid 45 by around 30 degrees when the lid opener 46 is operated by urging the lid 45 in the opening direction, and a switch for sensing whether the lid 45 is brought into the opened state or the closed state, for example, a member capable of generating a signal for lighting a display light on the side of the vehicle compartment 25 in the closed state of the lid 45, or announcing that the lid 45 is brought into the opened state when the engine is started in the opened state of the lid 45.

Figure 3:
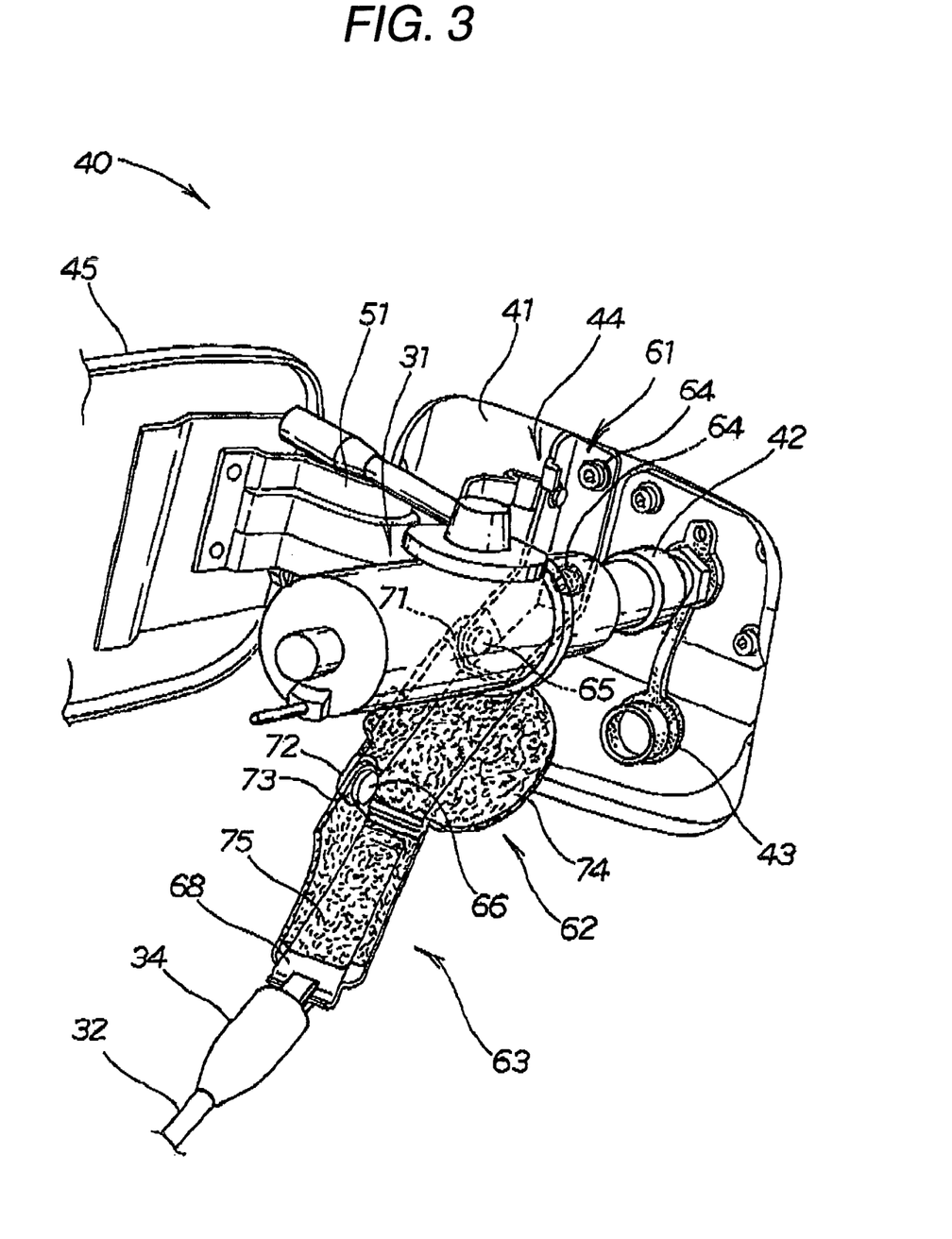
FIG. 3 is a perspective view of the fuel charging structure of the vehicle according to the present invention when a fuel charging nozzle is connected.

FIG. 3 is a perspective view of the fuel charging structure of the vehicle according to the present invention when a fuel charging nozzle is being connected. The earthing portion 44 includes a first member (base member) 61, a second member (middle member) 62 attached to the first member 61 rotatably and electrically and mechanically, and a third member (front end connecting member) 63 attached to the second member 62 rotatably and electrically and mechanically as a plurality of members electrically and mechanically attached to the side of the vehicle body (body) 11.

In the drawing, numerals 64, 64 designate bolts for electrically and mechanically attaching the first member 61 to the vehicle body (body) 11, numeral 65 designates a pin member for electrically and mechanically connecting the first and the second members 61, 62, and numeral 66 designates a pin member for electrically and mechanically connecting the second and the third members 62, 63.

Figure 4:
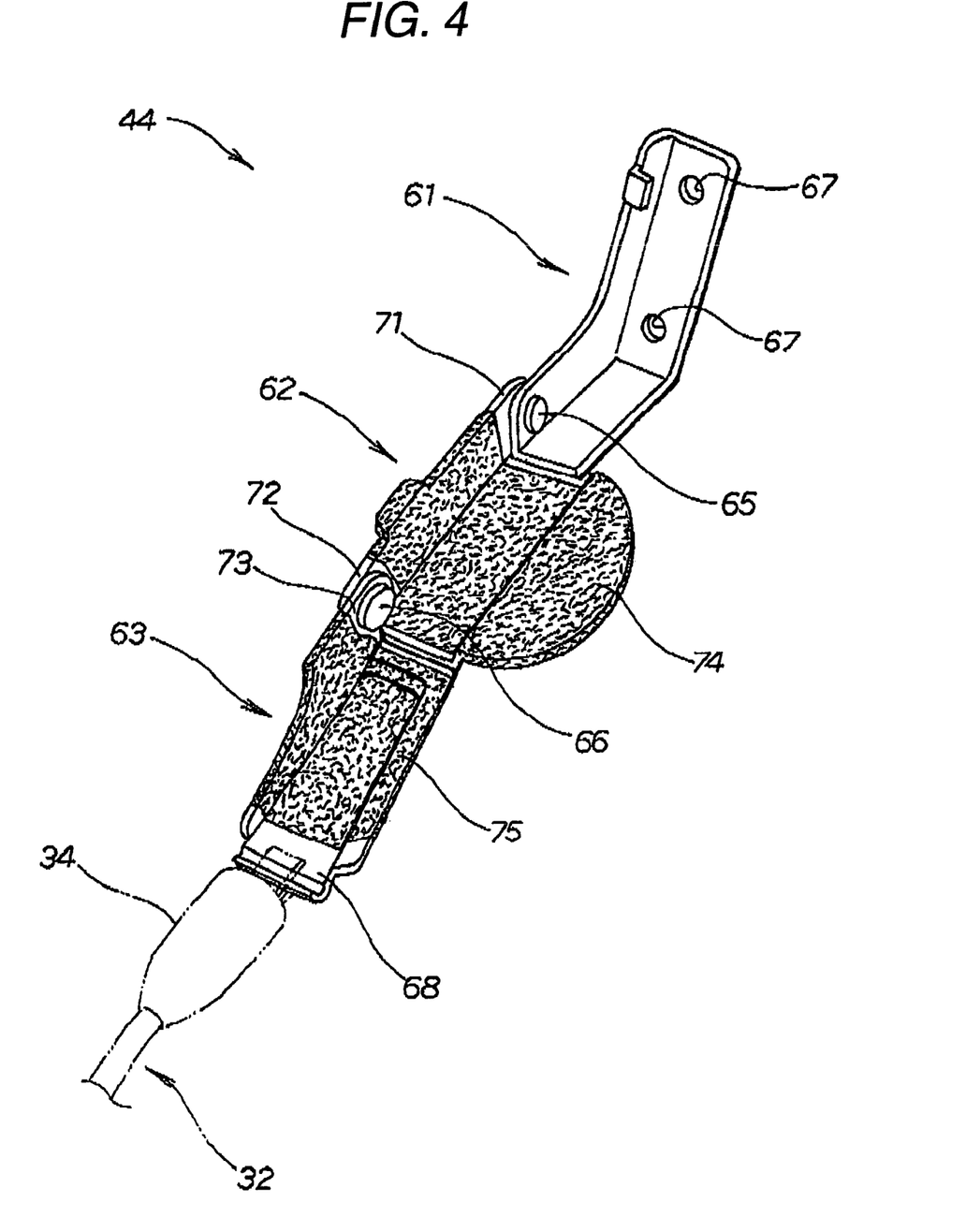
FIG. 4 is a perspective view of an earthing portion of the fuel charging structure of the vehicle according to the present invention.

FIG. 4 is a perspective view of the earthing portion of the fuel charging structure of the vehicle according to the present invention in which the first member 61 is formed with attaching holes 67, 67 as an attaching portion attached to the side of the vehicle 11 and is a member a total of which is provided with a conductivity.

The second member 62 is provided with a conductive portion 71 for being electrically conducted to the first member 61, an insulating portion (insulating film) 74 covered by nonconductive coating for electrically insulating, and a conductive portion 72 for being electrically conducted to the third member 63.

The third member 63 is formed with a conductive portion 73 for being electrically conducted to the second member 62, an insulating portion (insulating film) 75 covered by nonconductive coating for insulating electrically, and an earthing terminal (connection front end) 68 for electrically conducting a front end thereof for connecting the earth wire.

The earthing portion can be regarded such that one end (front end) of the earthing portion 44 is formed with the earthing terminal 68 electrically connectable with the earth wire 32, other end (root) thereof is formed with the attaching holes (attaching portions) 67, 67 attached to the vehicle body 11, and the earthing portion 44 is covered by nonconductive coating except the conductive portions 71 to 73 including the earthing terminal 68 and the first member 61.

By forming the earthing terminal 68 capable of being electrically connected to the earth wire 32 at the front end of the earthing portion 44, forming the attaching holes (attaching portions) 67, 67 attached to the vehicle body 11 at the root, and subjecting the earthing portion 44 to the nonconductive coating except the conductive portions 71 through 73 including the earthing terminal 68 and the first member 61, the earth wire 32 is connected to the earthing terminal 68 of the earthing portion 44. As a result, a position of connecting the earth wire 32 can clearly be shown and the operation of charging the fuel gas can smoothly be carried out.

Figure 5:
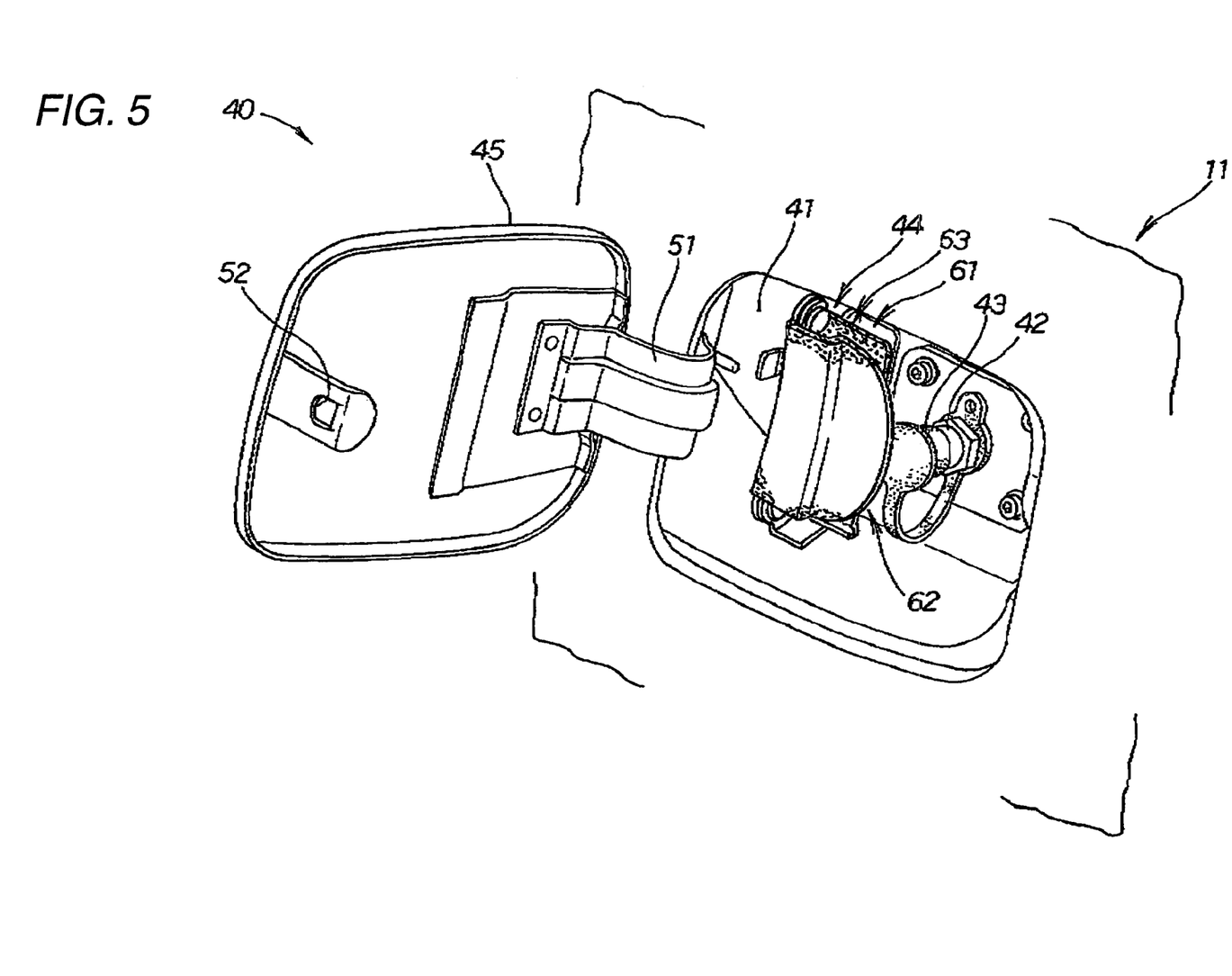
FIG. 5 is a perspective view of the fuel charging structure of the vehicle according to the present invention when a lid is opened.

FIG. 5 is a perspective view of the fuel charging structure of the vehicle according to the present invention when the lid is opened. The fuel gas charging portion structure 40 is the fuel gas charging portion structure of the gas fuel vehicle having the fuel gas charging port 42 connectable with the fuel charging nozzle 31 of the fuel gas charging station 30 at outside of the vehicle 10 shown in FIG. 1, the earthing portion 44 connectable with the earth wire 32 of the fuel gas charging station 30, and the openable and closable lid 45 for summarizingly covering the earthing portion 44 and the fuel gas charging port 42, and can be regarded to constitute the earthing portion 44 by the first through the third members (the plurality of members) 61 through 63 to cover at least a portion of the fuel gas charging port 42 by bringing the earthing portion 44 into the folded state in the closed state of the lid 45, the earthing portion 44 is brought from the folded state to a state of being connectable with the earth wire 32 and the fuel charging nozzle 31 is brought into a state of being chargeable to the fuel gas charging port 42 in the opened state of the lid 45.

For example, when the fuel gas charging portion structure of the gas fuel vehicle can simply be constituted, the constitution is preferable since a reduction in cost of the fuel gas charging portion structure can be achieved and when the operation of charging the fuel gas can smoothly be carried out, the operation is preferable since an operation time period of the charging operation can be shortened.

That is, by covering both the earthing portion 44 and the fuel gas charging port 42 by the openable and closable lid 45, the fuel gas charging portion structure 40 can simply be constituted. As a result, the reduction in the production cost of the fuel gas charging portion structure 40 can be achieved.

By constituting the earthing portion 44 by the first through the third members (the plurality of members) 61 through 63 and bringing the earthing portion 44 into the folded state in the closed state of the lid 45, at least a portion of the fuel gas charging port 42 is covered, in the opened state of the lid 45, by constituting the earthing portion 44 from the folded state into the state of being connectable with the earth wire 32 and bringing the fuel charging nozzle 31 into the state of being chargeable to the fuel gas charging port 42, before connecting the fuel charging nozzle 31 to the fuel gas charging port 42, the earthing portion 44 is removed from the fuel gas charging port 42.

Thereby, the operator can be urged to connect the earth wire to the earthing portion 44 in the fuel gas charging operation. As a result, the fuel gas charging operation can firmly be carried out.

Further, by constituting the earth connecting member 44 by the plurality of members 61 through 63, a distance from the fuel gas charging port 42 to the earth connecting member 44 can be set to be sufficiently long.

The fuel gas charging portion structure 40 can also be regarded as a structure in which the earthing portion having the first 61 to the third member 63 (the plurality of members) is containable inside the lid 45 (or the recess portion 41) in the folded state when the lid 45 is closed. Therefore, the fuel gas charging portion structure 40 can be constituted to be compact.

Figure 6A:
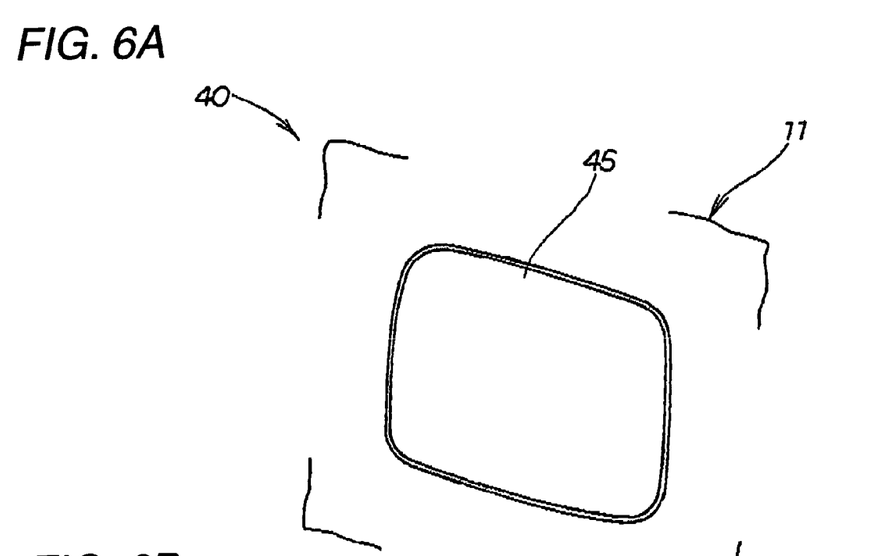
FIG. 6A is an explanatory view of the fuel charging structure of the vehicle according to the present invention when the lid is closed.
Figure 6B:
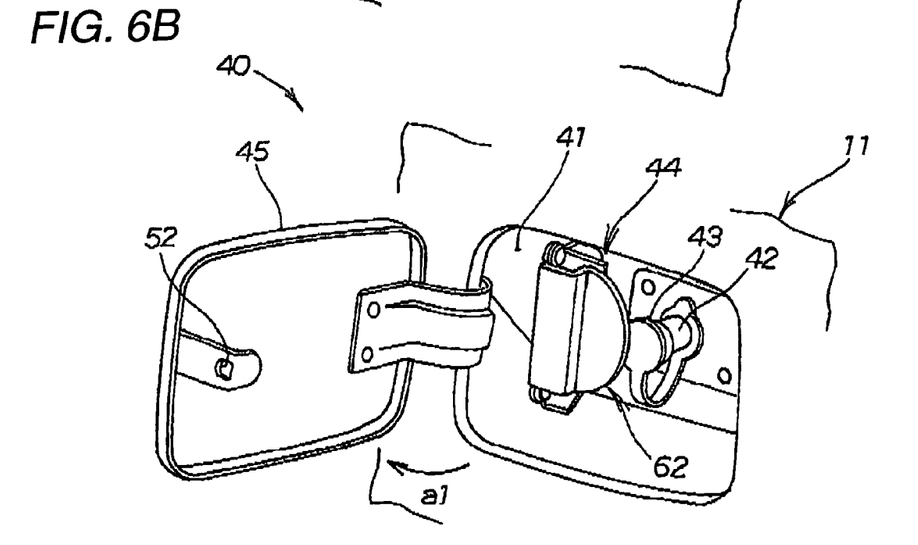
FIG. 6B is an explanatory view of the fuel charging structure of the vehicle according to the present invention when the lid is being opened.

FIG. 6A and FIG. 6B are explanatory views showing an initial state of the fuel charging structure of the vehicle according to the present invention.

FIG. 6A, there is shown the fuel gas charging portion structure 40 when the lid 45 is closed, for example, the lid can be designed to be the same as a lid of, for example, a gasoline vehicle and design performance of the vehicle 10 (refer to FIG. 1) can be promoted.

In FIG. 6B, the lid opener 46 (refer to FIG. 2) is operated, the locking portion 52 of the lid 45 is opened and the lid 45 is opened manually as shown by an arrow a1. According to the fuel gas charging portion structure 40, it is shown that the earthing portion having the first member 61 to the third member 63 (the plurality of members) can be contained inside the lid 45 (or the recess portion 41) in the folded state. Further, it is shown that the fuel gas charging port 42 is closed with the cap 43 and covered by a portion of the second member 62.

Figure 7A:
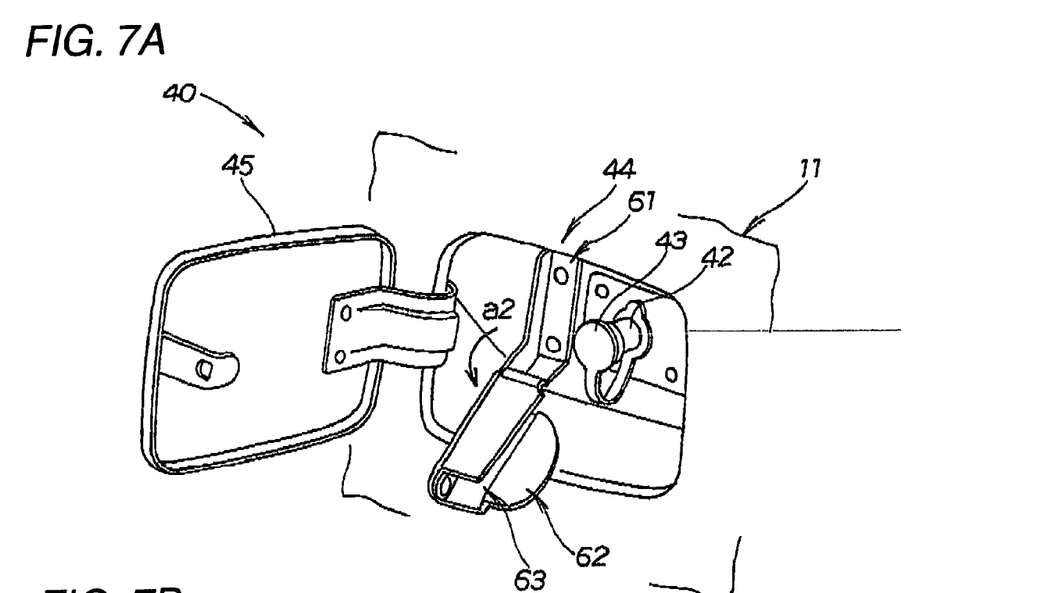
FIG. 7A is an explanatory view of the fuel charging structure of the vehicle according to the present invention when a earthing portion is being opened.
Figure 7B:
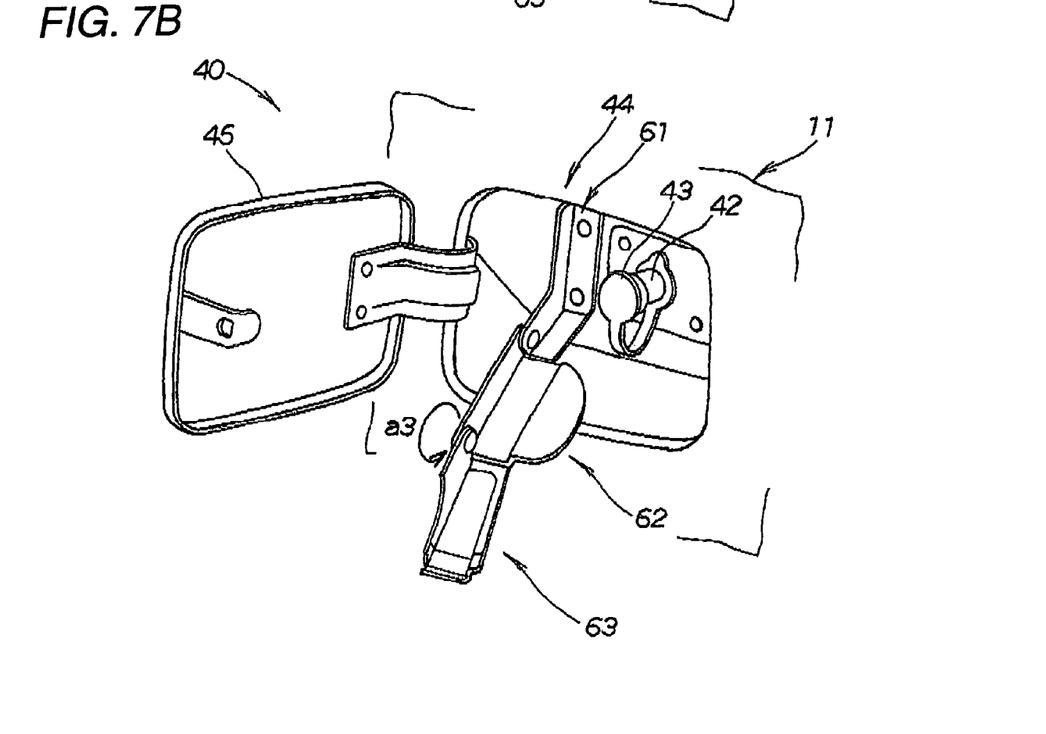
FIG. 7B is an explanatory view of the fuel charging structure of the vehicle according to the present invention when a earthing portion is opened.

FIG. 7A and FIG. 7B are explanatory views showing the fuel charging structure of the vehicle according to the present invention being prepared for the charging operation.

In FIG. 7A, the second member 62 is rotated as shown by an arrow a2, and the earthing portion 44 is opened from the state of being folded and covering the fuel gas charging port 42 (or the cap 43). Thereby, in the fuel gas charging operation, the operator is urged to connect the earth wire 32 (refer to FIG. 1) to the earthing portion 44.

In FIG. 7B, the third member 63 is rotated as shown by an arrow a3 to finish the preparation for connecting the earth wire 32 (refer to FIG. 1). For example, the operator can be urged to connect the earth wire 32 by displaying a caution (attention) or the like for urging the operator to connect the earth wire 32 (refer to FIG. 1) at a vicinity of the earthing portion 44.

Figure 8A:
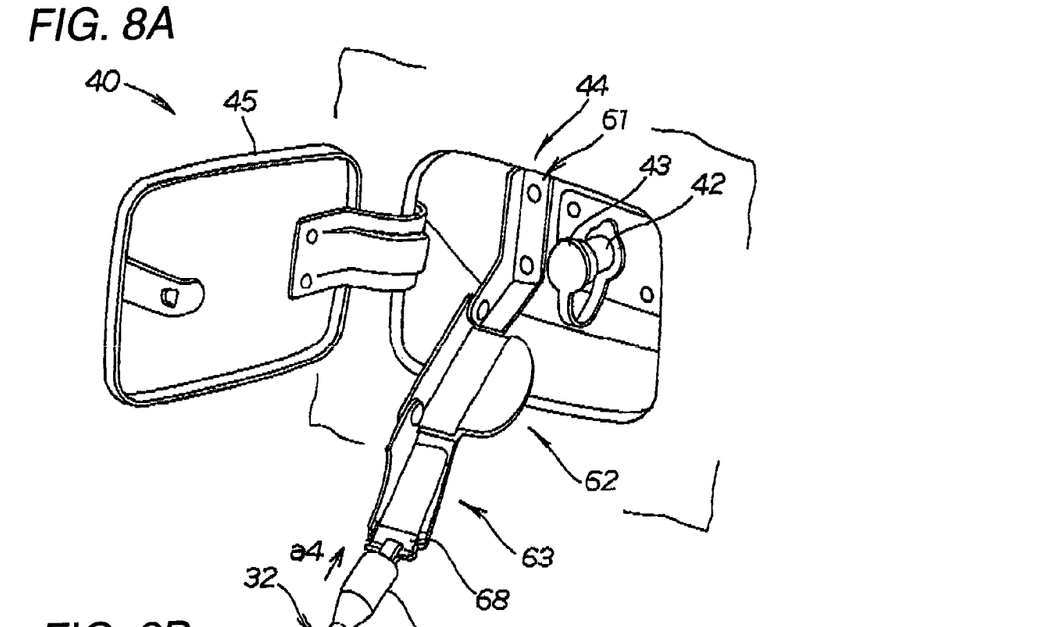
FIG. 8A is an explanatory view of the fuel charging structure of the vehicle according to the present invention when an earth wire is connected to the earthing portion.
Figure 8B:
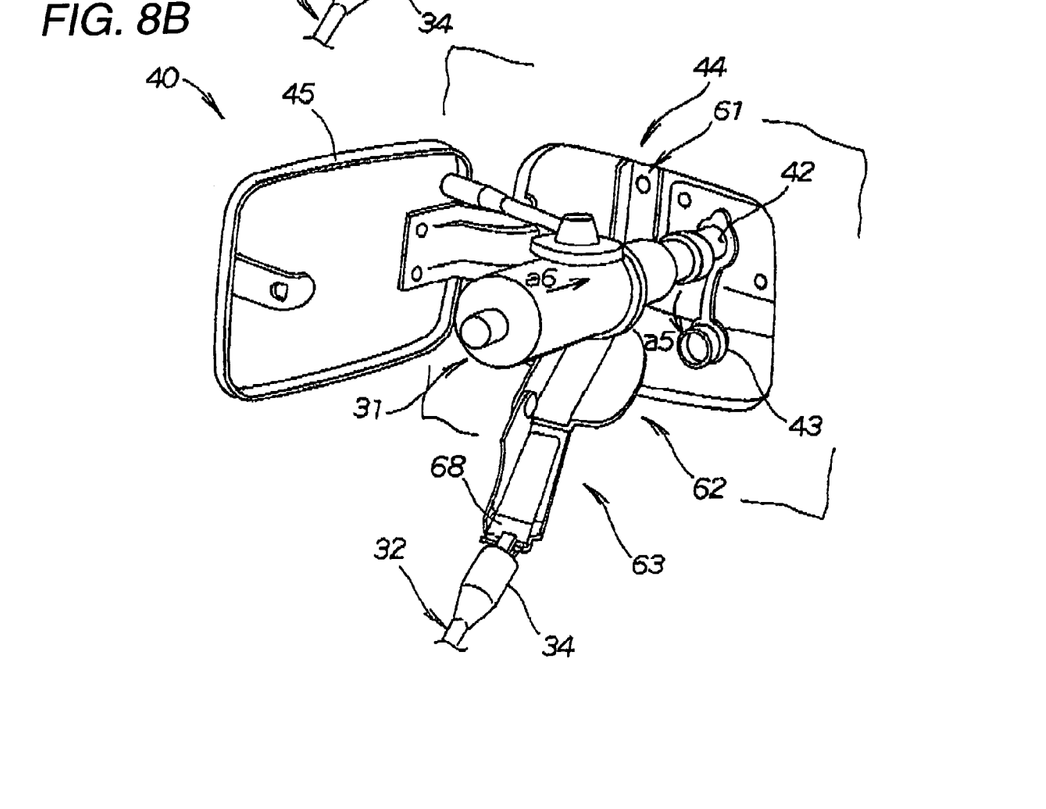
FIG. 8B is an explanatory view of the fuel charging structure of the vehicle according to the present invention when the fuel charging nozzle is being connected.

FIG. 8A and FIG. 8B are explanatory views showing a state of charging operation of the fuel charging structure of the vehicle according to the present invention.

In FIG. 8A, by connecting the clip 34 of the earth wire 32 to the earthing terminal 68 of the third member 63 as shown by an arrow a4, the potential difference between the fuel gas charging station 30 and the vehicle 10 shown in FIG. 1 is nullified.

In FIG. 8B, the cap 43 is detached from the fuel gas charging port 42 as shown by an arrow a5, the fuel charging nozzle 31 is connected to the fuel gas charging port 42 as shown by an arrow a6 in order to start charging the fuel gas.

That is, the fuel gas charging portion structure 40 can also be regarded to constitute an operation method for carrying out operation of charging the fuel gas including a step of opening the lid 45, a step of releasing the earthing portion 44 from covering the fuel gas charging port 42, a step of connecting the earth wire 32 to the earthing terminal 68 of the earthing portion 44, a step of detaching the cap 43 from the fuel gas charging port 42, and a step of connecting the fuel charging nozzle 31 to the fuel gas charging port 42 in the above-described order.

However, the step of removing the cap 43 from the fuel gas charging port 42 may be carried out before the step of connecting the earth wire 32 to the earthing terminal 68 of the earthing portion 44.

According to the fuel gas charging portion structure 40, the operation of charging the fuel gas can smoothly be carried out by covering the earthing portion 44 and the fuel gas charging port 42 summarizingly by the openable and closable lid 45. As a result, the operation time of the fuel gas charging operation can be shortened.

The operator can be urged to connect the earth wire 32 to the earthing portion 44 in the fuel gas charging operation by constituting the earthing portion 44 by the first through the third members (the plurality of members) 61 through 63, covering at least a portion of the fuel gas charging port 42 by the earthing portion 44 in the closed state of the lid 45 (when the earth connecting member 44 is not earthed) and setting the step of releasing the earthing portion 44 from covering the fuel gas charging port 42 before connecting the fuel charging nozzle 31 to the fuel gas charging port 42. Thereby, as a result, the fuel gas charging operation can firmly be carried out.

Further, the fuel charging structure of the vehicle according to the present invention is not limited to the structure in which the earthing portion 44 is constituted by 3 pieces, which are the first member 61 to the third member 63, as shown in FIG. 4. The earthing portion may be constituted by 2 pieces or 4 pieces or more. The number of pieces can pertinently be set in accordance with the distance from the gas charging port to the earthing portion.

In the fuel charging structure of the vehicle according to the present invention, in addition to the insulating portions 74, 75 formed by subjecting the earthing portion 44 to the nonconductive coating as shown in FIG. 4, a caution (or an attention) urging to connect the earth wire 32 may be displayed thereon.

The fuel charging structure of the vehicle according to the present invention is not limited to the structure in which the first member 61 of the earthing portion 44 is made to be conductive as a whole as shown in FIG. 4. The first member 61 may be subjected to coating the same as that for the vehicle body or the nonconductive coating except the portion that needs to be conductive electrically.

The fuel charging structure of the vehicle according to the present invention is not limited to the structure in which the gas charging port 42 is partially covered by the second member 62 of the earthing portion 44 as shown in FIG. 5 and does not hamper the fuel gas charging port 42 to be totally covered by the earthing portion 44.

Furthermore, the present invention is not limited to the structure in which the fuel gas charging port 42 is covered by the plurality of members 61 to 63 when the not earthed. For example, the earthing portion, which covers the fuel gas charging port when not earthed, can be constituted to be pulled in order to release the fuel gas charging port from being covered so that it is able to charge the gas when earthed. The structure of the earthing portion can pertinently be changed in its design within the range not deviated from the scope of claims.

The fuel charging structure of the vehicle according to the present invention is not limited to the fuel gas charging portion structure of the gas fuel vehicle as shown in FIG. 3, but it may be a fuel charging structure of any vehicles.

While there has been described in connection with the preferred embodiments of the present invention, it will be obvious to those skilled in the art that various changes and modifications may be made therein without departing from the present invention, and it is aimed, therefore, to cover in the appended claims all such changes and modifications as fall within the true spirit and scope of the present invention.

What is claimed is:

1. A fuel charging structure of a vehicle comprising:
    a fuel charging port to which a fuel charging nozzle of an external fuel charging station is to be connected; and
    an earthing portion, said earthing portion being the portion through which a vehicle body is to be connected to an earth wire of the fuel charging station,
    wherein the fuel charging port is at least partially covered by the earthing portion when the earthing portion is not earthed, and
    the fuel charging port is brought into a state of being chargeable by the fuel charging nozzle when the earthing portion is earthed.

2. The fuel charging structure of a vehicle according to claim 1, wherein the earthing portion comprises:
    a conductive portion including:
        an earthing terminal to which the earth wire is to be connected electrically; and
        an attaching portion to be attached to the vehicle body, and
    an insulating portion covered by a nonconductive coating on the surface thereof.

3. The fuel charging structure of a vehicle according to claim 2, wherein the earthing terminal is disposed at one end of the earthing portion, and
    the attaching portion is disposed at the other end of the earthing portion.

4. The fuel charging structure of a vehicle according to claim 1, wherein the earthing portion comprises a plurality of members interconnected rotatably.

5. The fuel charging structure of a vehicle according to claim 4, wherein one of the plurality of members includes:

an earthing terminal to which the earth wire is to be connected electrically; and an insulating portion covered by a nonconductive coating on the surface thereof, and other of the plurality of the members includes an attaching portion to be attached to a vehicle body.

6. The fuel charging structure of a vehicle according to claim 4, further comprising:

a lid which is opened or closed selectively for covering both the earthing portion and the fuel charging port, wherein the plurality of members are interconnected rotatably so that the earthing portion is folded when stored inside the closed lid.

7. The fuel charging structure of a vehicle according to claim 1, wherein the earthing portion is adapted to be pulled in order to release the fuel charging port from being covered by the earthing portion.

* * * * *